United States Patent
Kawamura et al.

(10) Patent No.: US 9,663,042 B2
(45) Date of Patent: May 30, 2017

(54) DECORATIVE STRUCTURE FOR VEHICLE

(71) Applicant: HONDA MOTOR CO., LTD., Tokyo (JP)

(72) Inventors: Kazuyuki Kawamura, Wako (JP); Kenichi Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/901,777

(22) PCT Filed: Jul. 2, 2014

(86) PCT No.: PCT/JP2014/067655
§ 371 (c)(1),
(2) Date: Dec. 29, 2015

(87) PCT Pub. No.: WO2015/002235
PCT Pub. Date: Jan. 8, 2015

(65) Prior Publication Data
US 2016/0368434 A1   Dec. 22, 2016

(30) Foreign Application Priority Data

Jul. 3, 2013  (JP) .................................. 2013-139959

(51) Int. Cl.
*B60R 13/04*   (2006.01)
*B60R 13/06*   (2006.01)
(Continued)

(52) U.S. Cl.
CPC ................. *B60R 13/06* (2013.01); *B60J 1/18* (2013.01); *B60J 5/107* (2013.01); *B60J 10/20* (2016.02); *B60J 10/70* (2016.02); *B60R 13/04* (2013.01)

(58) Field of Classification Search
CPC ....... B60R 13/04; B60R 13/043; B60R 13/06; B60J 10/20; B60J 10/70; B60J 1/18
See application file for complete search history.

(56) References Cited

U.S. PATENT DOCUMENTS 4,773,700 A * 9/1988 Sannomiya ............... B60J 5/107
296/106
5,618,079 A   4/1997 Yukihiko et al.
(Continued)

FOREIGN PATENT DOCUMENTS

JP   2-171315 A   7/1990
JP   5-85161 A    4/1993
(Continued)

OTHER PUBLICATIONS

Notification of Transmittal of the Translation of the International Preliminary Report on Patentability (Form PCT/IB/338) dated Jan. 7, 2016, with Form PCT/IPEA/409, issued in counterpart International Patent Application No. PCT/JP2014/067655. (4 pages).
(Continued)

*Primary Examiner* — Gregory Blankenship
(74) *Attorney, Agent, or Firm* — Westerman, Hattori, Daniels & Adrian, LLP

(57) ABSTRACT

A decorative structure (15) for a vehicle is provided with a left sealing member (27) between a left illuminating light (23) and a rear-window glass (25). The left illuminating light (23) is provided with a lens surface section (51) having a projecting surface section (56) which projects toward rear trim (22); a lens inner wall (66) opposing the left-side surface (45) of the rear window glass (25); and a rib-shaped section (53) projecting from the projecting surface section (56) toward the back-door (21) side. The left seating mem-
(Continued)

ber (27) connects the lens-inner-wall surface (66a) of the lens inner wall (66) and the rib-wall surface (75a) of the rib-shaped section (53).

7 Claims, 8 Drawing Sheets

(51) Int. Cl.
*B60J 1/18* (2006.01)
*B60J 5/10* (2006.01)
*B60J 10/70* (2016.01)
*B60J 10/20* (2016.01)

(56) References Cited

U.S. PATENT DOCUMENTS

| | | | |
|---|---|---|---|
| 9,057,528 B2 | 6/2015 | Browne et al. | |
| 2005/0280293 A1 | 12/2005 | MacNee et al. | |
| 2009/0066113 A1* | 3/2009 | Kiriakou | B60J 5/107 296/146.15 |
| 2011/0089719 A1* | 4/2011 | Yamazaki | B60R 13/04 296/193.06 |
| 2015/0202948 A1* | 7/2015 | Saiki | B60R 13/04 49/502 |
| 2015/0283885 A1* | 10/2015 | Kyung | B60J 5/0402 296/146.2 |
| 2016/0368434 A1* | 12/2016 | Kawamura | B60J 1/18 |

FOREIGN PATENT DOCUMENTS

| | | |
|---|---|---|
| JP | 8-11529 A | 1/1996 |
| JP | 2004-306825 A | 11/2004 |
| JP | 2012-116224 A | 6/2012 |

OTHER PUBLICATIONS

International Search Report dated Aug. 12, 2014, issued in counterpart application No. PCT/JP2014/067655 (1 page).
Office Action dated Dec. 21, 2016, issued in counterpart Chinese Patent Application No. 201480038416.0, with Partial English translation. (4 pages).

* cited by examiner

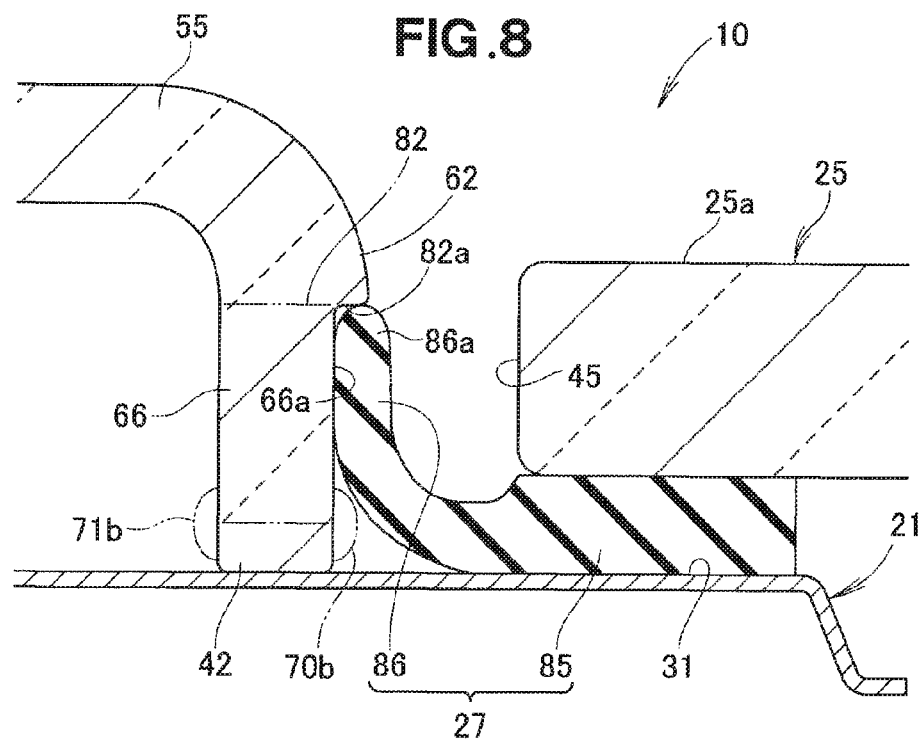
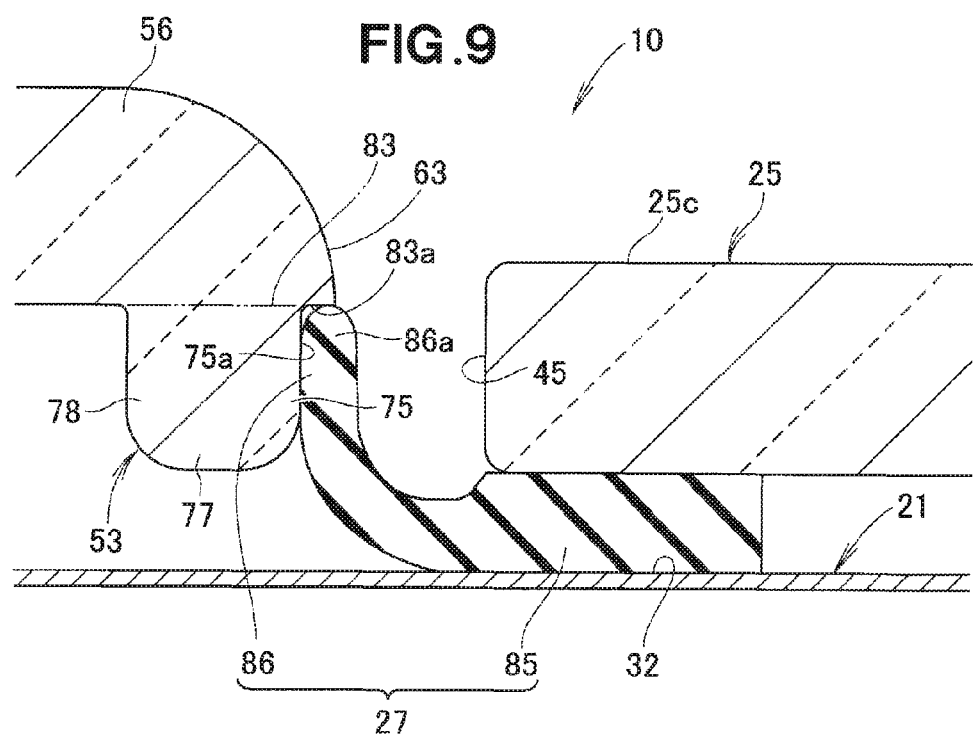

DECORATIVE STRUCTURE FOR VEHICLE

TECHNICAL FIELD

The present invention relates to a decorative structure for a vehicle in which window glass is provided laterally adjacent to a decorative member, and a sealing member is provided between the decorative member and the window glass.

BACKGROUND ART

In certain decorative structures for vehicles, a rear brake light (a decorative member) and rear window glass (window glass) are laterally adjacent above a rear bumper face (an exterior member), and the space between the decorative member and the window glass is sealed with a sealing member (for example, see Patent Literature 1).

Specifically, the side wall of the decorative member is arranged facing the side wall of the window glass, and the sealing member connected to the rear surface of the window glass is made to abut the side wall of the decorative member, whereby the space between the decorative, member and the window glass is sealed by the sealing member.

To ensure the visual appeal of the vehicle, the gap between the decorative member and the exterior member is preferably kept small. Having the outward front surface of the decorative member (referred to below as the front surface part) project (extend) toward the exterior member can be considered as means for keeping the gap small.

However, when the front surface part of the decorative member is made to project toward the exterior member, a gap is formed between the projecting front surface part and the vehicle body. Specifically, there is no side wall for bringing the sealing member into abutment (in contact) between the front surface part and the vehicle body.

Therefore, the sealing member lies below the projecting front surface part, which might compromise the visual appeal of the vehicle.

PRIOR ART LITERATURE

Patent Literature

[Patent Literature 1] Japanese Patent Application Laid-Open Publication No. 2012-116224

SUMMARY OF INVENTION

Technical Problem

The present invention addresses the problem of providing a decorative structure for a vehicle in which the visual appeal of the vehicle can be ensured by keeping the gap between the decorative member and the exterior member small and satisfactorily arranging the sealing member between the decorative member and the window glass.

Solution to Problem

According to en aspect of the present invention, there is provided a decorative structure for a vehicle in which an exterior member is provided to a vehicle body, a decorative member is provided above and/or below the exterior member, window glass is provided laterally adjacent to the decorative member, and a sealing member is provided between the decorative member and the window glass, wherein the decorative structure for a vehicle is characterized in that the decorative member comprises: a front surface part forming the vehicle-outward front surface and having a projecting front surface part that projects toward the exterior member so as to face the exterior member; a wall part which is provided to a side edge of the front surface part that excludes the projecting front surface part and that is near the window glass, the wall part facing a glass-side wall of the window glass; and a rib-shaped part bulging from the projecting front surface part toward the vehicle body so as to be positioned nearer to the exterior member than the wall part; the sealing member abutting the wall surface of the wall part that faces the glass-side wall and abutting the rib wall surface of the rib-shaped part that faces the side wall.

Preferably, the wall surface and the rib wall surface are formed to be coplanar.

Preferably, the front surface part is linked with the wall part and the rib-shaped part by a linking part, and a front wall surface of the from surface part projects nearer to the glass-side wall than the wall surface and the rib wall surface, whereby the linking part is formed into a step shape.

Preferably, the decorative member includes an end wall part extending laterally from the end of the wall part near the projecting front surface part, and extending in the vehicular inward-outward direction; the end wall part and the wall part are welded to a holder far supporting the end wall art and the wall part; and the amount by which the rib-shaped part bulges gradually increases away from the wall part toward the exterior member.

Advantageous Effects of Invention

In the present invention, the projecting front surface part is in the front surface part of the decorative member, and the projecting front surface part projects toward the exterior member. The gap between the front surface part (i.e., the decorative member) and the exterior member can thereby be kept small.

Furthermore, the rib-shaped part is arranged nearer to the exterior member than the wall part by causing the rib-shaped part to bulge from the projecting front surface part toward the vehicle body. The sealing member can thereby be made to abut the rib-shaped part, and the sealing member can be satisfactorily arranged between the decorative member and the window glass.

Thus, the visual appeal of the vehicle can be ensured by keeping the gap between the decorative member and the exterior member small and satisfactorily arranging the sealing member between the decorative member and the window glass.

In the invention, the wall surface that faces the glass-side wall of the wall part and the rib wall surface that faces the glass-side wall of the rib-shaped part are formed to be coplanar. The visual appeal of the vehicle can thereby be ensured because the sealing member can be made to satisfactorily abut the wall surface and the rib wall surface.

In the invention, the linking part is formed into a step shape due to the front wall surface of the front surface part protruding nearer to the glass-side wall than the wall surface and the rib wall surface. Consequently, the sealing member abutting the wall surface and the rib wall surface can also be made to abut the uneven-shaped linking part.

The sealing member can thereby be impeded by the linking part from shifting toward the front wall surface, and the sealing member can be made to satisfactorily abut the wall surface and the rib wall surface.

Furthermore, due to the linking part being formed into a step shape, the molding tolerance (molding error) of the front surface part, the wall part, and the rib-shaped part can be assimilated by the linking part. High precision is thereby not needed in the front surface part, the wall part, and the rib-shaped part when these members are molded.

In the invention, the end wall part and the wall part are welded to the holder. Therefore, welded parts bulge out of the end wall part, the wall part, and the holder.

In view of this, the amount by which the rib-shaped part bulges gradually increases away from the end wall part toward the exterior member. Consequently, the amount by which the rib-shaped part bulges can be kept small in the proximity of the end wall part and the wall part. The rib-shaped part can thereby be prevented from interfering with the welded parts of the end wall part, the wall part, and the holder.

BRIEF DESCRIPTION OF DRAWINGS

FIG. 8 is a cross-sectional view taken along line 8-8 of FIG. 7; and

FIG. 9 is a cross-sectional view taken along line 9-9 of FIG. 7.

DESCRIPTION OF EMBODIMENTS

An embodiment of the present invention is described below with reference to the accompanying drawings. The terms "front (Fr)," "rear (Rr)," "left (L)," and "right (R)" conform with the directions from the perspective of the driver.

Embodiments

A decorative structure 15 for a vehicle according to an embodiment shall be described.

Figure 1:
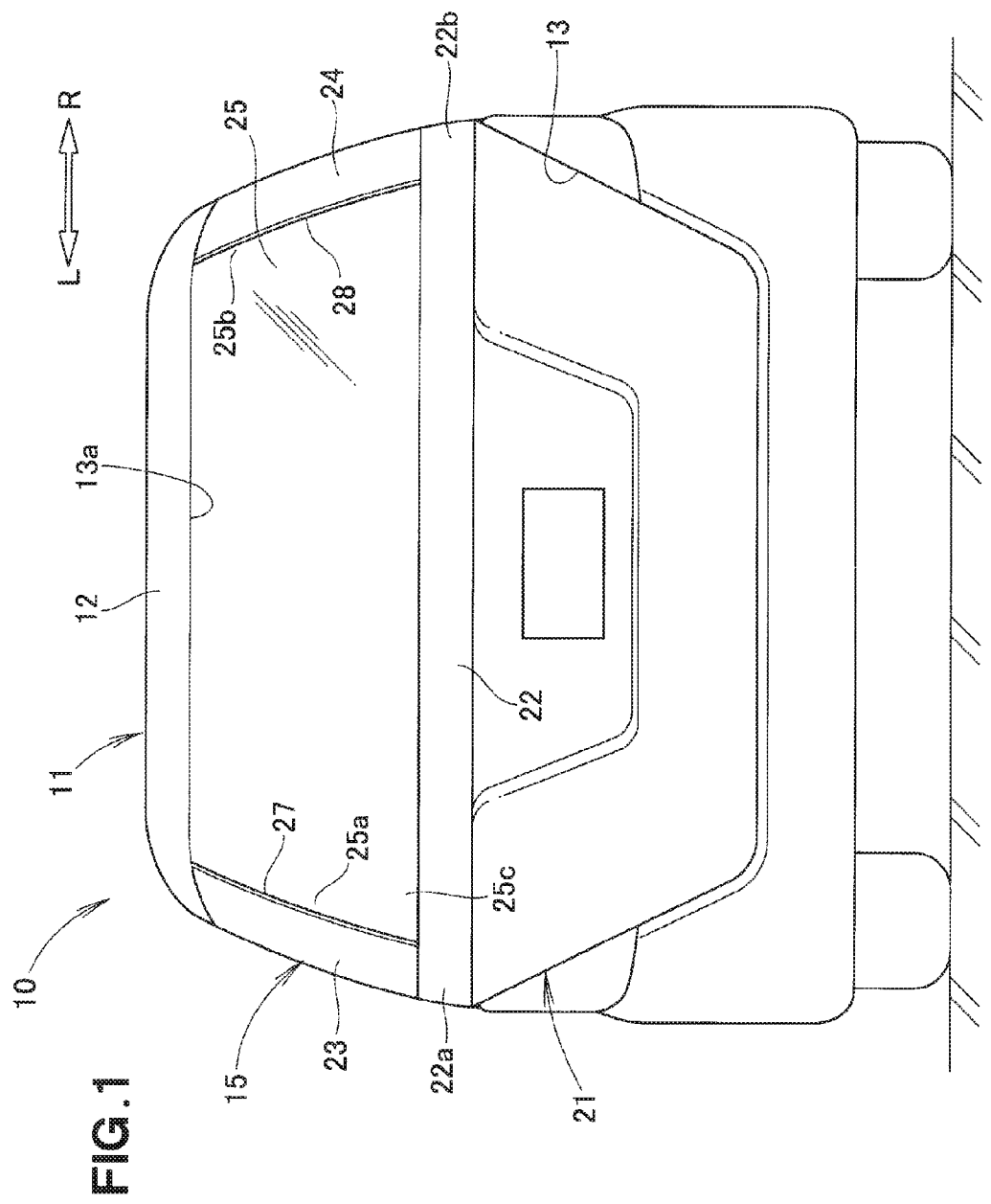
FIG. 1 is a rear surface view showing a vehicle including the decorative structure for a vehicle according to the present invention.

As shown in FIG. 1, in a vehicle 10, a door-opening part 13 is provided to the rear part 12 of it vehicle body 11, the vehicle 10 being provided with a decorative structure 15 for a vehicle that is attached in an openable and closeable manner to the door-opening part 13.

A back door structure is given as an example of the decorative structure 15 for a vehicle, but the decorative structure 15 for a vehicle is not limited thereto.

The decorative structure 15 for a vehicle includes a back door 21 attached in an openable and closeable manner to an upper part 13a of the door-opening part 13, rear trim (the exterior member) 22 provided approximately in the middle of the back door 21, a left illuminating light (a decorative member) 23 provided above a left, end 22a of the rear trim 22, a right illuminating light (a decorative member) 24 provided above a right end 22b of the rear trim 22, and rear window glass 25 provided between the left and right illuminating lights 23, 24.

Furthermore, the decorative structure 15 for a vehicle includes a left sealing member 27 provided between the left illuminating light 23 and the rear window glass 25, and a right sealing member 28 provided between the right illuminating light 24 and the rear window glass 25.

The left and right illuminating lights 23, 24 are used as, e.g., rear brake lights, rear turn signal lights, or combination lights.

The left illuminating light 23 and the right illuminating light 24 are bilaterally symmetric members, and only the left illuminating light 23 is described below, while a description of the right illuminating light 24 is omitted.

The left sealing member 27 and the right sealing member 28 are bilaterally symmetric members, and only the left sealing member 27 is described below, while a description of the right sealing member 28 is omitted.

Figure 2:
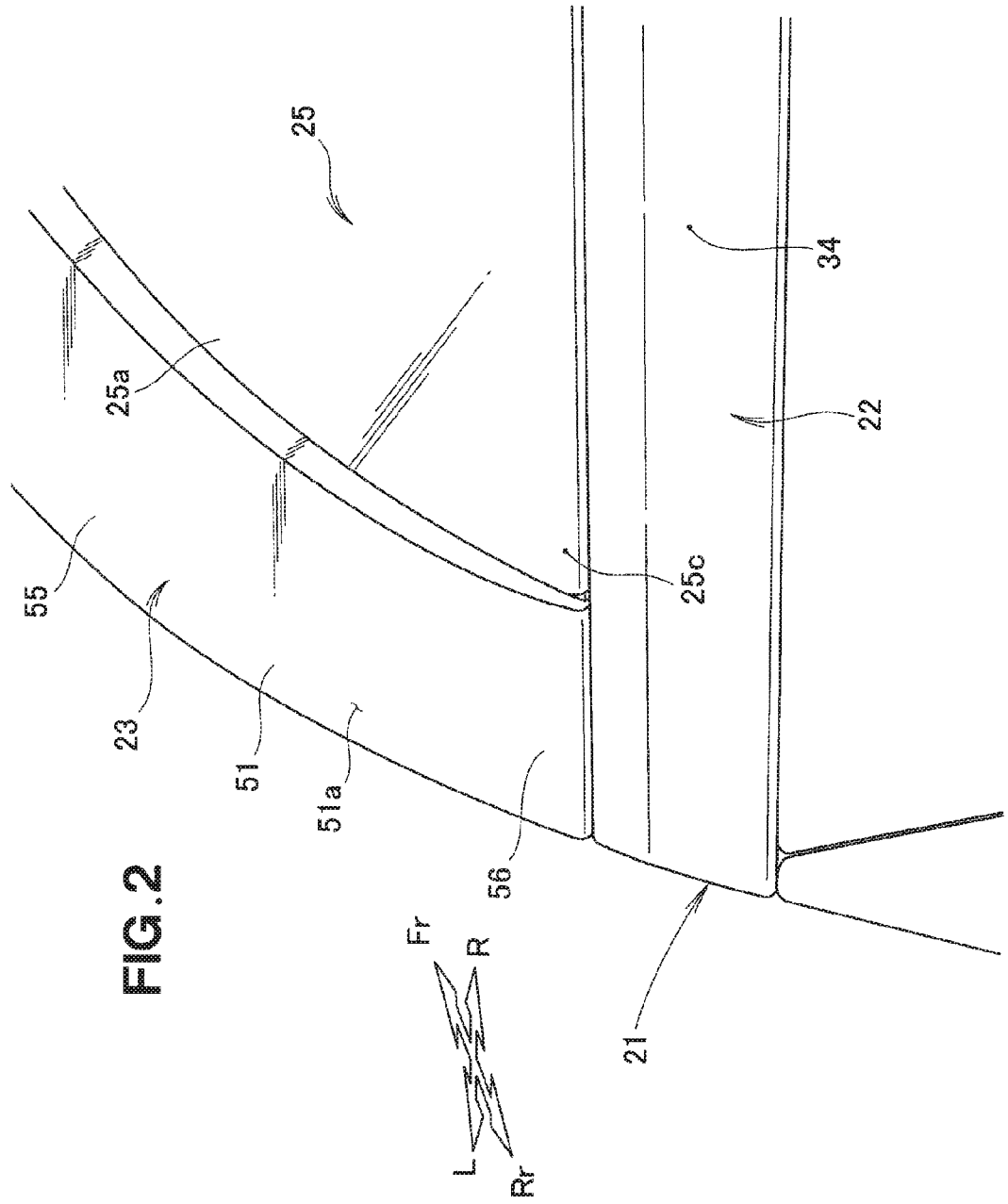
FIG. 2 is a perspective view showing the left side of the decorative structure for a vehicle of FIG. 1.
Figure 3:
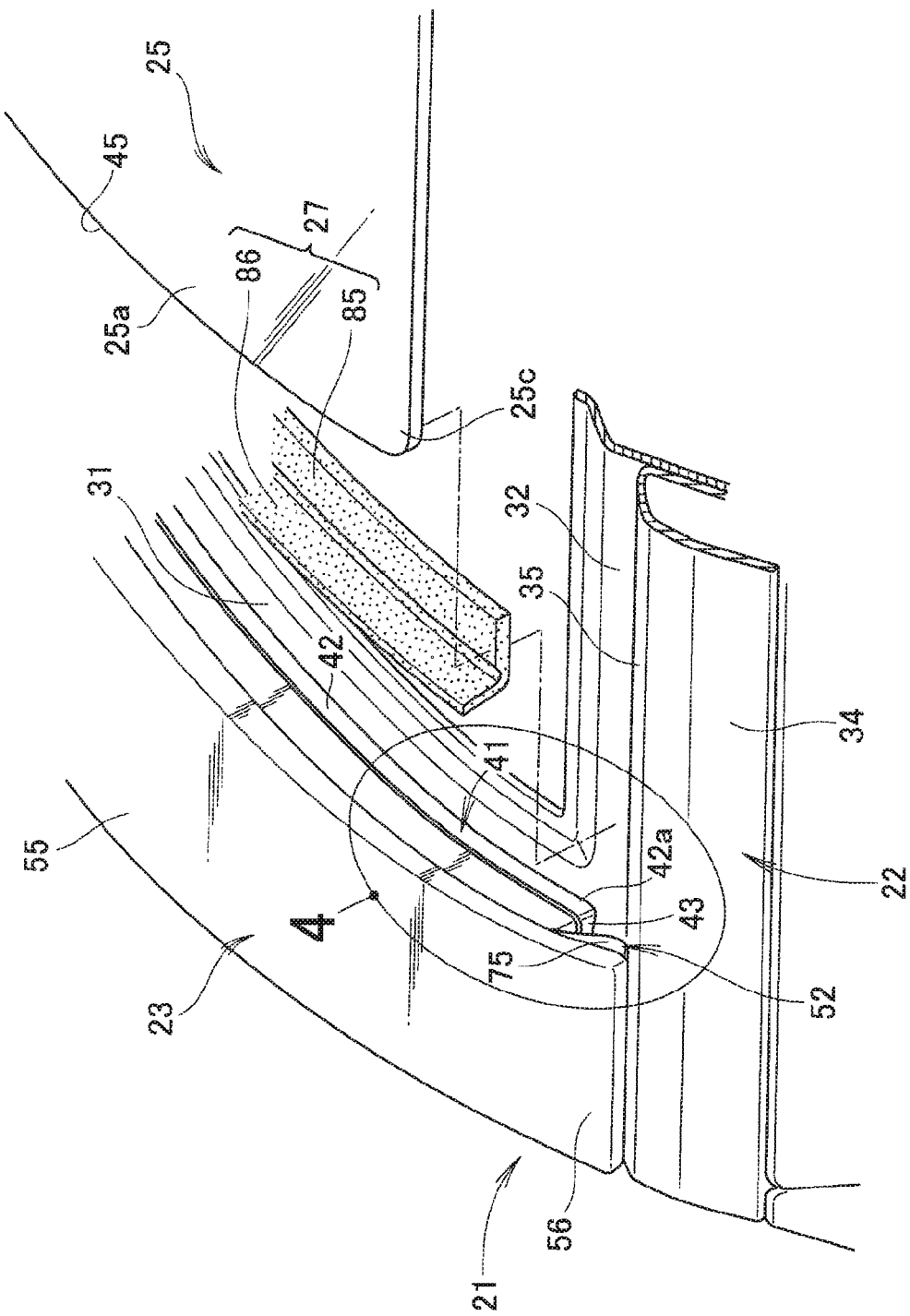
FIG. 3 is an exploded perspective view showing the decorative structure for a vehicle of FIG. 2.

As shown in FIGS. 2 and 3, the back door 21 has a left frame part 31 laterally adjacent on the inward side to the left illuminating light 23, a right frame part (not shown) laterally adjacent on the inward side to the right illuminating light 24 (see FIG. 1), and a lower frame part 32 above and adjacent to the rear trim 22.

The left end 25a of the rear window glass 25 is placed on the left frame part 31 via the left sealing member 27, and the right end 25b (see FIG. 1) of the rear window glass 25 is placed on the right frame part via the right sealing member 28. The left sealing member 27 and the right sealing member 28 are bilaterally symmetric members.

The lower left end 25c of the rear window glass 25 is placed on the lower frame part 32 via the lower end of the left sealing member 27.

The rear trim 22, which is an exterior member made of a resin extends substantially parallel in the lateral direction in the approximate vertical middle of the back door 21 (see FIG. 1). The rear trim 22 has a trim surface part 34 facing vehicle-rearward, and a trim upper part 35 projecting vehicle-forward at an upward slope from the upper end of the trim surface part 34.

Figure 4:
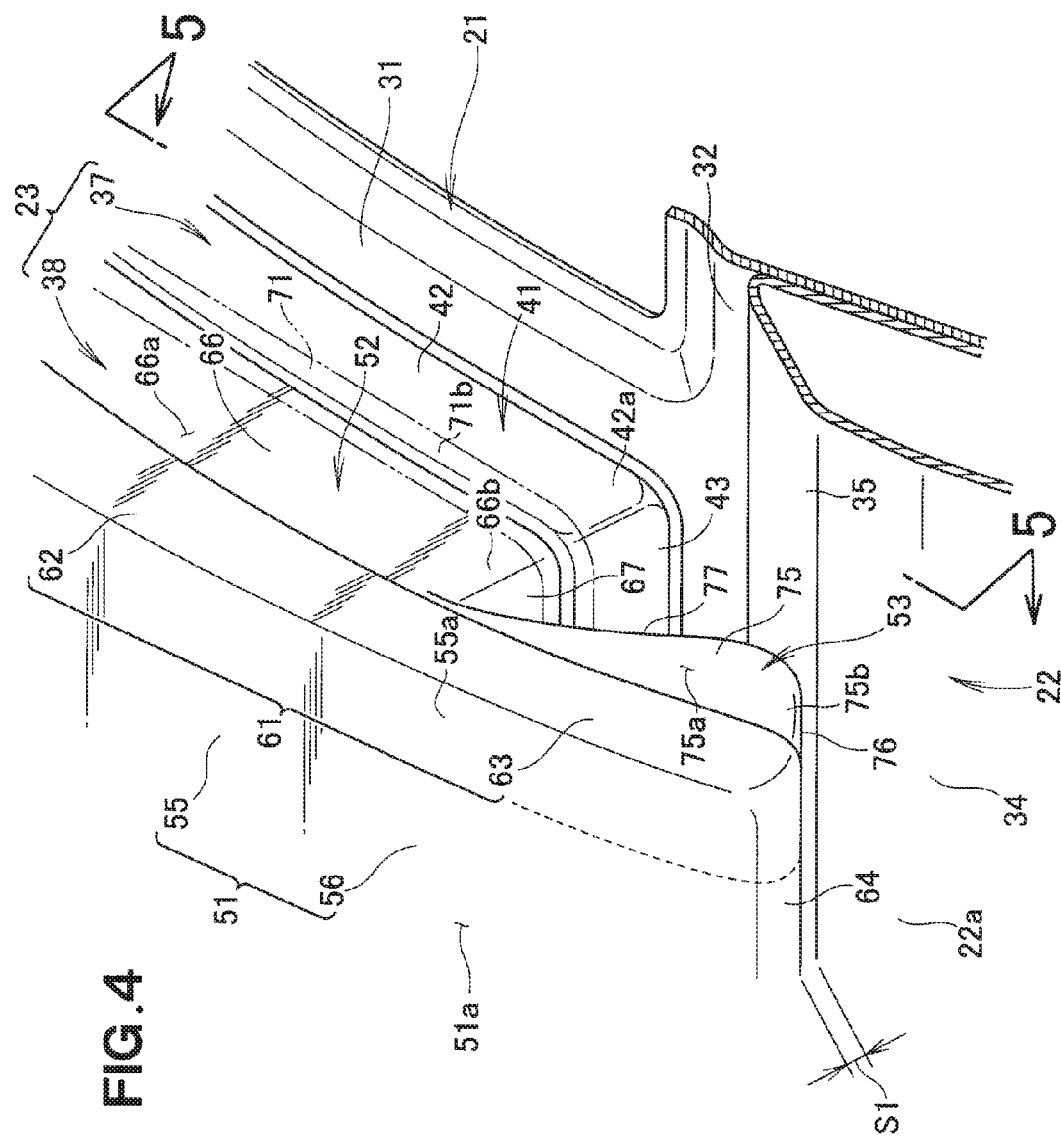
FIG. 4 is an enlarged view of section 4 in FIG. 3.
Figure 5:
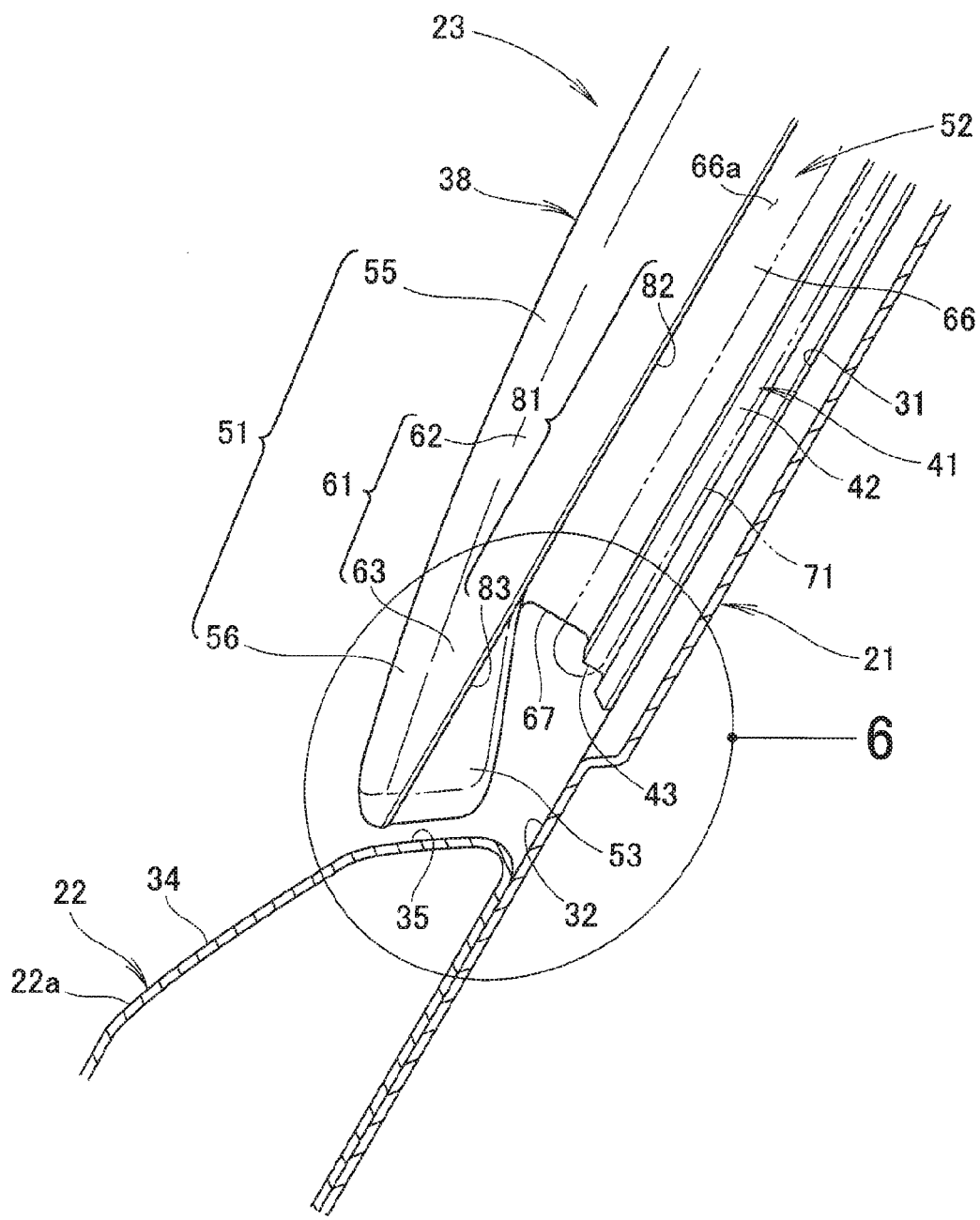
FIG. 5 is a cross-sectional view taken along line 5-5 of FIG. 4.

As shown in FIGS. 4 and 5, the left illuminating light 23 is provided above the left end 22a of the rear trim 22. The left illuminating light 23 includes a holder housing) 37 attached to the back door 21, and to lens 38 integrally welded to the upper part of the holder 37.

The holder 37 is attached to a section of the back door 21 that is laterally adjacent on the outward side to the left frame part 31. The holder 37 has a holder outer peripheral wall 41 formed into a substantially rectangular shape along the outer periphery of the lens 38.

The holder outer peripheral wall 41 has a holder inner wall 42 extending along the left-side surface (a glass-side surface) 45 of the rear window glass 25 (see FIG. 3), and a holder lower wall 43 extending laterally outward from the lower end 42a of the holder inner wall 42.

Returning to FIG. 3, the holder inner will 42 is a section that faces the left side surface 45 of the rear window glass 25, due to extending along the left-side surface 45 of the rear window glass 25.

The holder lower all 43 is a section that is arranged above and adjacent to the trim upper part 35, due to extending laterally outward from the lower end 42a of the holder inner will 42.

The lens 38 is integrally welded to the upper part of the holder outer peripheral wall 41.

The lens 38 has a lens front surface part 51 forming a front surface that faces outward (particularly rearward) with respect to the vehicle, a lens outer peripheral wall 52 projecting toward the holder outer peripheral wall 41 from the outer periphery of the lens front surface part 51, and a rib-shaped part 53 provided nearer to the trim upper part 35 than the lens outer peripheral wall 52. The lens 38 is integrally molded.

In the lens front surface part 51, a front surface 51a facing outward with respect to the vehicle is formed into a substantially rectangular shape as seen in a plan view. The lens front surface part 51 has a front surface main body part 55 provided to a position corresponding to the holder 37, and a projecting front surface part 56 that projects toward the trim upper part 35 from the front surface main body part 55.

Due to the projecting front surface part 56 projecting toward the trim upper part 35, the gap S1 between the lens front surface part 51 (i.e., the left illuminating light 23) and the trim upper part 35 is kept small.

The front surface main body part 55, which is the section of the lens front surface part 51 that excludes the projecting front surface part 56, has a side edge 62 (referred to below as the "inner main body wall surface 62") on the side near the rear window glass 25 (see FIG. 3). The inner main body wall surface 62 is the surface that faces the left-side surface 45 (see FIG. 3) of the rear window glass 25.

The projecting front surface part 56 has an inner projecting wall surface (i.e., the inner edge of the projecting, front surface part 56) 63 facing the left-side surface 45 of the rear window glass 25, and a projecting lower wall surface 64 facing the trim upper part 35. An inner front wall surface 61 of the lens front surface part 51 is formed by the inner main body wall surface 62 and the inner projecting wall surface 63.

The lens outer peripheral wall 52 is made to project from the front surface main body part 55 toward the holder outer peripheral wall 41, and is formed into a substantially rectangular shape so as to face the holder outer peripheral wall 41.

The lens outer peripheral wall 52 has a lens inner wall (a wall part) 66 projecting from the inner main body wall surface 62 toward the holder inner wall 42, and a lens lower wall (an end wall part) 67 projecting from the lower end 55a of the front surface main body part 55 toward the holder lower wall 43.

The lens inner wall 66 has a lens inner wall surface (a wall surface) 66a facing the left-side surface 45 (see FIG. 3) of the rear window glass 25. The lens inner wall surface 66a is formed flat so as to face the left-side surface 45.

The lens lower wall 67 extends in the vehicular inward-outward direction due to projecting from the lower end 55a of the front surface main body part 55 toward the holder lower wall 43, and extends laterally from the lower end 66b of the lens inner wall 66 (the end of the lens inner wall 66 that is near the projecting front surface part 56).

The lower part of the lens outer peripheral wall 52 is integrally welded to the upper part of the holder outer peripheral wall 41.

Due to the lower part of the lens outer peripheral wall 52 being welded to the upper part of the holder outer peripheral wall 41, the upper part of the holder outer peripheral will 41 and the lower part of the lens outer peripheral wall 52 are integrally joined in a welded section 71 (indicated by the imaginary lines). The welded section 71 is where the upper part a the holder outer peripheral wall 41 and the lower part of the lens outer peripheral wall 52 fuse when welded, and this section bulges to the outside of the holder outer peripheral wall 41 and the lens outer peripheral wall 52.

Figure 6:
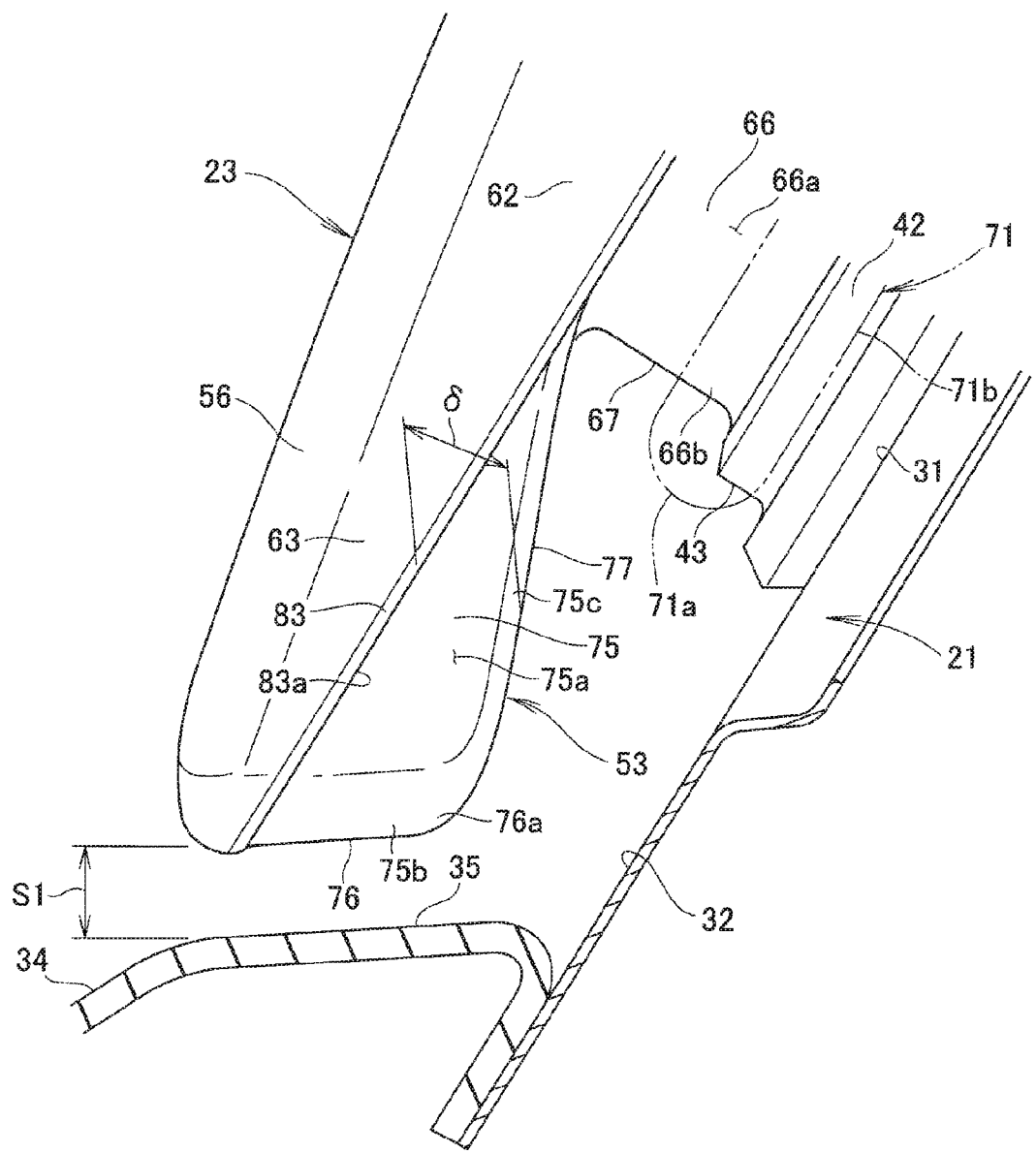
FIG. 6 is an enlarged view of section 6 of FIG. 5.

Specifically, as shown in FIG. 6, the lens lower wall 67 is welded to the holder lower wall 43, and the lens inner wall 66 is welded to the holder inner wall 42. The welded section 71a of the lens lower all 67 and the holder lower wall 43, and the welded section 71b (see FIG. 8 as well) of the lens inner wall 66 and the holder inner wall 42, thereby bulge outward.

The rib-shaped part 53 is a bulging part (protruding part) that bulges from the inner projecting will surface 63 toward the back door 21 (the vehicle body 11). The rib-shaped part 53, which bulges from the inner projecting wall surface 63, is provided nearer to the trim upper part 35 than the lower end 66b of the lens inner wall 66. Specifically, the rib-shaped part 53 is provided between the trim upper part 35 and the lower end 66b of the lens inner wall 66.

As shown in FIGS. 4 and 6, the rib-shaped part 53 has a rib inner wall 75 facing the left-side surface 45 (see FIG. 3) of the rear window glass 25, a rib lower wall 76 provided to the lower end 75b of the rib inner wall 75, and a rib front wall 77 provided to the front end 75c of the rib inner wall 75 and the front end 76a of the rib lower wall 76.

Furthermore, the rib-shaped part 53 has a rib outer wall 78 (see FIG. 9) in the laterally outer side of the rib inner wall 75. The rib-shaped part 53 is formed into a substantially triangular shape, as seen in a side view, by the rib inner wall 75, the rib outer wall 78, the rib lower wall 76, and the rib front wall 77.

Figure 7:
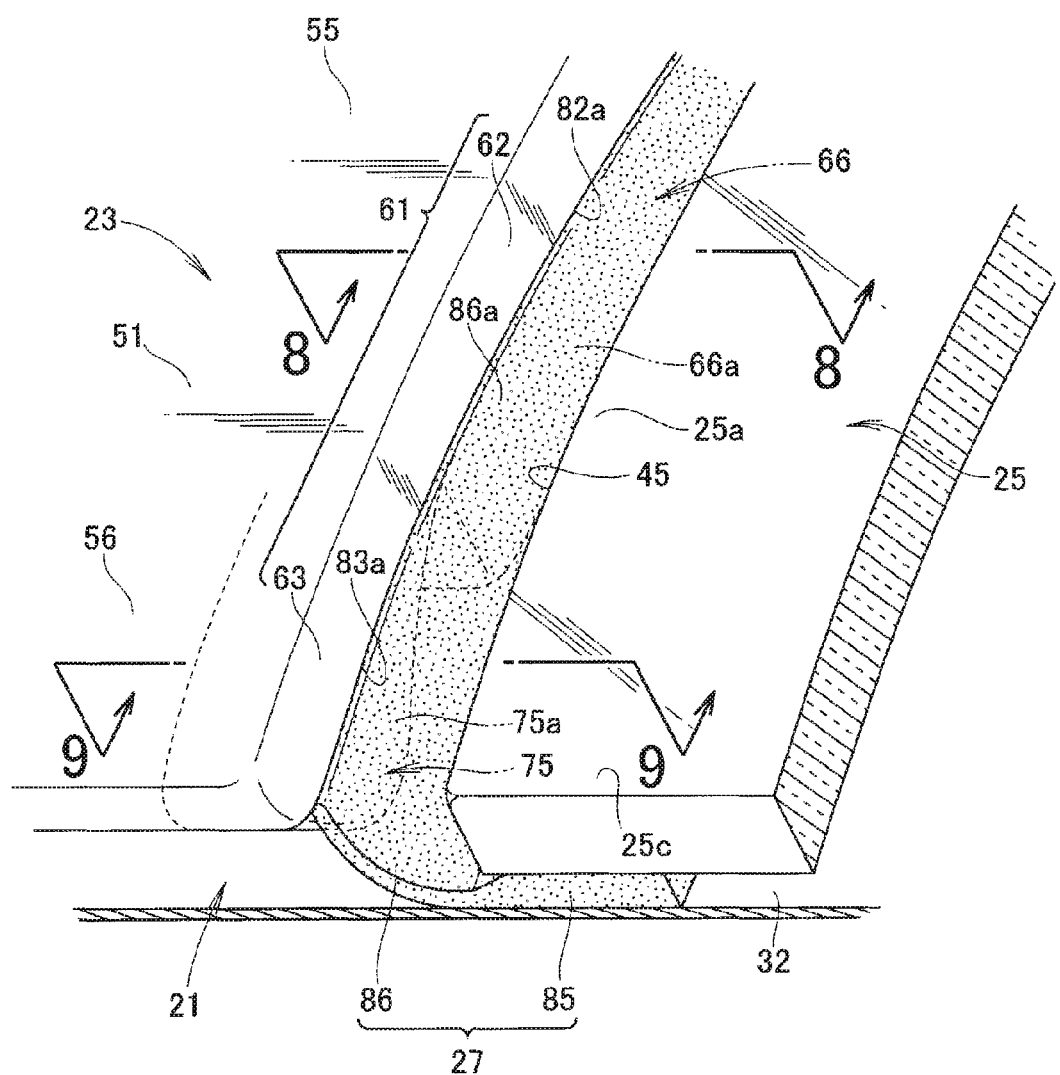
FIG. 7 is a perspective view showing the relationship between the left illuminating light and the left sealing member according to the present invention.

As shown in FIGS. 4 and 7, the rib inner wall 75 has a rib wall surface 75a facing the left-side surface 45 of the rear window glass 25. The rib wall surface 75a is formed flat so as to face the left-side surface 45.

A lip part 86 of the left sealing member 27 can thereby be made to abut the rib wall surface 75a, and the left sealing member 27 (particularly the lip part 86) can be satisfactorily arranged between the left illuminating light 23 and the rear window glass 25.

Thus, the visual appeal of the vehicle 10 can be satisfactorily ensured by keeping the gap S1 between the left illuminating light 23 and the trim upper part 35 small, and satisfactorily arranging the lip part 86 between the left illuminating light 23 and the rear window glass 25.

Furthermore, the rib wall surface 75a of the rib-shaped part 53 is formed to be coplanar with the lens inner wall surface 66a. In other words, the rib wall surface 75a and the lens inner wall surface 66a are arranged in the same plane facing the left-side surface 45 of the rear window glass 25.

Consequently, the lip part 86 of the left sealing member 27 satisfactorily abuts the rib wall surface 75a and the lens inner wall surface 66a.

Returning to FIG. 5, due to the lens 38 being integrally molded, the lens inner wall 66 and the rib-shaped part 53 are both linked by a linking part 81 to the inner front wall surface 61 of the lens front surface part 51.

Specifically, the lens inner wall 66 is integrally linked by a front surface linking part 82 to the inner main body wall surface 62 of the front surface main body part 55. The rib-shaped part 53 is also integrally linked by a projecting linking part 83 to the inner projecting wall surface 63 of the projecting front surface part 56.

The linking part 81 is formed by the front surface linking part 82 and the projecting linking part 83.

As shown in FIGS. 4 and 6, due to the lens lower wall 67 being welded to the holder lower wall 43 and the lens inner wall 66 being welded to the holder inner wall 42, the welded section 71a and the welded section 71b (see FIG. 8 as well) bulge outward. Particularly, the welded section 71a is formed on the vehicle body 21 facing side of the inner projecting wall surface 63. Therefore, when the rib shaped part 53 is made to bulge from the inner projecting wall surface 63 toward the back door 21 (i.e., the vehicle body 11), there is concern of the rib-shaped part 53 interfering with the welded section 71a.

In view of this, the bulging amount δ of the rib-shaped part 53 is gradually increased away from the lens lower wall 67 toward the trim upper part 35. The bulging amount δ is the distance between the projecting linking part 83 and the rib front wall 77, or in other words, the distance between the rib front wall 77 and a projecting uneven part 83a, described hereinafter.

Specifically, the rib front wall 77 is formed into an inclined shape so as to gradually move away from the projecting linking part 83 (the projecting uneven part 83a) as it moves away from the lens lower wall 67 toward the trim upper part.

Consequently, the bulging amount δ of the rib-shaped part 53 in the proximity of the lens lower wall 67 and the lens inner wall 66 can be kept small. The rib-shaped part 53 can thereby be prevented from interfering with the welded section 71a and the welded section 71b.

As shown in FIGS. 8 and 9, the inner main body wall surface 62 of the front surface main body part 55 projects nearer to the left-side, surface 45 of the rear window glass 25 than the lens inner wall surface 66a of the lens inner wall 66. Consequently, a front surface uneven part 82e is formed into is step shape in the front surface linking part 82.

Forming the front surface linking part 82 into a step shape allows the molding tolerance (molding error) of the front surface main body part 55 and the lens inner wall 66 to be assimilated by the front surface linking part 82. This obviates the need for high precision in the front surface main body part 55 and the lens inner wall 66 when these members 55, 66 are molded.

Furthermore, in the projecting linking part 83, the inner projecting wall surface 63 of the projecting front surface part 56 projects nearer to the left-side surface 45 of the rear window glass 25 than the rib wall surface 75a of the rib inner wall 75. Consequently, the projecting uneven part 83a is formed into a step shape in the projecting linking part 83.

Forming the projecting linking part 83 into a step shape allows the molding tolerance (molding error) of the projecting front surface part 56 and the rib-shaped part 53 to be assimilated by the linking part. This obviates the need for high precision in the projecting front surface part 56 and the rib-shaped part 53 when these members 56, 53 are molded.

Thus, forming the front surface linking part 82 into a step shape and the projecting linking part 83 into a step shape obviates the need for high precision in the front surface main body part 55, the lens inner wall 66, and the rib-shaped part 53.

A sealing base 85 of the left sealing member 27 is placed on the left frame part 31 of the back door 21, and the left end 25a of the rear window glass 25 is placed on the sealing base 85. The lip part 86 of the left sealing member 27 abuts the lens inner wall surface 66a of the lens inner wall 66.

In this state, the distal end 86a of the lip part 86 abuts the front surface uneven part 82a. Consequently, the lip part 86 is impeded by the front surface uneven part 82a from shifting toward the inner main body wall surface 62. This allows the lip part 86 of the left sealing member 27 to satisfactorily abut the lens inner wall surface 66a.

The lower end of the sealing base 85 is placed on the lower frame part 32 of the back door 21, and the lower left end 25c of the rear window glass 25 is placed on the lower end of the sealing base 85. The lower end of the lip part 86 abuts the rib wall surface 75a of the rib inner wall 75.

In this state, the distal end 86a formed in the lower end of the lip part 86 abuts the projecting uneven part 83a. Consequently, the lower end of the lip part 86 can be impeded by the projecting uneven part 83a from shifting toward the inner projecting wall surface 63. This allows the lower end of the lip part 86 to satisfactorily abut the rib wall surface 75a.

Further, the rib wall surface 75a and the lens inner wall surface 66a are arranged in the same plane facing the left-side surface 45 of the rear window glass 25. The rib wall surface 75a and the lens inner wall surface 66a are arranged to be coplanar.

Consequently, the lip part 86 of the left sealing member 27 satisfactorily abuts the rib wall surface 75a and the lens inner will surface 66a, which allows the visual appeal of the vehicle 10 to be ensured.

The decorative structure for a vehicle according to the present invention is not limited to the embodiment previously described; modifications, improvements, and such can be made as appropriate.

For example, in the previous embodiment, a back door structure was given as an example of the decorative structure 15 for a vehicle, but the decorative structure 15 for a vehicle is not limited thereto. For example, the decorative structure 15 for a vehicle can be applied to other sections such as a side door structure, a front corner window structure, or a quarter window structure.

In the previous embodiment, an example was described in which the left and right illuminating lights 23, 24 were both provided above the rear trim 22, but such an arrangement is not provided by way of limitation; the left and right illuminating lights 23, 24 can also be provided below the rear trim 22.

Furthermore, in the previous embodiment, an example was described in which the window glass was provided laterally adjacent on the inward side to the left and right illuminating lights 23, 24, but such an arrangement is not provided by way of limitation; the window glass can also be provided laterally adjacent on the outward side to the left and right illuminating lights 23, 24.

In the previous embodiment, an example was described in which the left and right illuminating lights 23, 24 were applied as decorative members, but such an arrangement is not provided by way of limitation; trim or other types of decorative members can be applied.

Furthermore, in the previous embodiment, the rear trim 22 made of a resin was given as an example of the exterior member, but such an arrangement is not provided by way of limitation; another member made of glass or the like can be used as the exterior member.

The shapes and configurations of the vehicle, the vehicle body, the decorative structure for a vehicle, the rear trim, the left and right illuminating lights, the rear window glass, the left and right sealing members, the holder, the lends, the left-side surface of the rear window glass, the lens front surface part, the front surface of the lens front surface part, the rib-shaped part, the projecting front surface part, the inner front wall surface of the lens front surface part, the inner main body wall surface, the lens inner wall, the lens inner wall surface, the lower end of the lens inner wall, the lens lower wall, the rib inner wall, the rib well surface, the linking part, the front surface linking part, the projecting linking part, and other components presented in the previous embodiment are not limited to those exemplified and may be modified as appropriate.

INDUSTRIAL APPLICABILITY

The present invention can be suitably applied to an automobile including a decorative structure for a vehicle in which window glass is provided adjacent to a decorative member and a sealing member is provided between the decorative member and the window glass.

LIST OF REFERENCE SIGN

10 Vehicle
11 Vehicle body
15 Decorative structure for a vehicle
22 Rear trim (exterior member)
23, 24 Left and right illuminating lights (decorative members)
25 Rear window glass (window glass)
27, 28 Left and right sealing members (sealing members)
37 Holder
38 Lens
45 Left-side surface of rear window glass (glass-side wall)
51 Lens front surface part (front surface part)
51a Front surface of lens front surface part
53 Rib-shaped part
56 Projecting front surface part
61 Inner front wall surface (front wall surface) of lens front surface part
62 Inner main body wall surface (side edge adjacent to roar window glass)
66 Lens inner wall (wall part)
66a Lens inner wall surface (wall surface)
66b Lower end of lens inner wall (end adjacent to projecting front surface part)
67 Lens lower wall (end wall part)
75 Rib inner wall
75a Rib wall surface
81 Linking part
82 Front surface linking part
83 Projecting linking part
δ Bulging amount

The invention claimed is:

1. A vehicular decorative structure in which an exterior member is provided to a vehicle body, a decorative member is provided above and/or below the exterior member, window glass is provided laterally adjacent to the decorative member, and a sealing member is provided between the decorative member and the window glass,
  wherein the decorative member comprises:
  a front surface part forming the vehicle-outward front surface and having a projecting front surface part that projects toward the exterior member so as to face the exterior member;
  a wall part which is provided to a side edge of the front surface part that excludes the projecting front surface part and that is near the window glass, the wall part facing a glass-side wall of the window glass; and
  a rib-shaped part bulging from the projecting front surface part toward the vehicle body so as to be positioned nearer to the exterior member than the wall part, the sealing member abutting a wall surface of the wall part that faces the glass-side wall and abutting a rib wall surface of the rib-shaped part that faces the glass-side wall, characterized in that the decorative member and the window glass are spaced from each other with the sealing member interposed therebetween.

2. The vehicular decorative structure of claim 1, wherein the wall surface and the rib wall surface are formed to be coplanar.

3. The vehicular decorative structure of claim 1 wherein the front surface part is linked with the wall part and the rib-shaped part by a linking part; and
  a front wall surface of the front surface part projects nearer to the glass-side wall than the wall surface and the rib wall surface, whereby the linking part is formed into a step shape.

4. The vehicular decorative structure of claim 1, wherein the decorative member includes an end wall part extending laterally from an end of the wall part near the projecting front surface part, and extending in the vehicular inward-outward direction,
  the end wall part and the wall part are welded to a holder for supporting the end wall part and the wall part, and
  the amount by which the rib-shaped part bulges gradually increases away from the wall part toward the exterior member.

5. The vehicular decorative structure of claim 2 wherein the front surface part is linked with the wall part and the rib-shaped part by a linking part; and
  a front wall surface of the front surface part projects nearer to the glass-side wall than the wall surface and the rib wall surface, whereby the linking part is formed into a step shape.

6. The vehicular decorative structure of claim 2, wherein the decorative member includes an end wall part extending laterally from an end of the wall part near the projecting front surface part, and extending in the vehicular inward-outward direction,
  the end wall part and the wall part are welded to a holder for supporting the end wall part and the wall part, and
  the amount by which the rib-shaped part bulges gradually increases away from the wall part toward the exterior member.

7. The vehicular decorative structure of claim 3, wherein the decorative member includes an end wall part extending laterally from an end of the wall part near the projecting front surface part, and extending in the vehicular inward-outward direction,
  the end wall part and the wall part are welded to a holder for supporting the end wall part and the wall part, and
  the amount by which the rib-shaped part bulges gradually increases away from the wall part toward the exterior member.

* * * * *